United States Patent [19]
Saegusa

[11] Patent Number: 5,287,400
[45] Date of Patent: Feb. 15, 1994

[54] COMMUNICATION CONTROL DEVICE CAPABLE OF QUICKLY SEARCHING FOR AN IDLE SPEECH CHANNEL IN A STANDBY MODE IN A CORDLESS TELEPHONE SYSTEM

[75] Inventor: Noboru Saegusa, Tokyo, Japan
[73] Assignee: NEC Corporation, Tokyo, Japan
[21] Appl. No.: 921,724
[22] Filed: Jul. 30, 1992
[30] Foreign Application Priority Data
Jul. 30, 1991 [JP] Japan .................... 3-190263
[51] Int. Cl.$^5$ .......................... H04M 11/00
[52] U.S. Cl. ............................ 379/58; 379/61
[58] Field of Search ............. 379/56, 63, 58, 61
[56] References Cited

U.S. PATENT DOCUMENTS

| | | | |
|---|---|---|---|
| 4,875,231 | 10/1989 | Hara et al. | 379/61 |
| 5,044,010 | 8/1991 | Frenkiel et al. | 379/61 |
| 5,157,709 | 10/1992 | Ohteru | 379/58 |

FOREIGN PATENT DOCUMENTS

| | | |
|---|---|---|
| 0137943 | 4/1985 | European Pat. Off. . |
| 0171071 | 2/1986 | European Pat. Off. . |
| 0248351 | 12/1987 | European Pat. Off. . |
| 0345939 | 12/1989 | European Pat. Off. . |
| 0401916 | 12/1990 | European Pat. Off. . |

Primary Examiner—Jin F. Ng
Assistant Examiner—William D. Cumming
Attorney, Agent, or Firm—Sughrue, Mion, Zinn, Macpeak & Seas

[57] ABSTRACT

In a communication control device which is operable in a standby mode or in an active mode and which is located between a cordless telephone set and a subscriber connected to the device through a telephone line to carry out communication therebetween by controlling a plurality of radio speech channels and a control channel assigned to the cordless telephone sets, a monitoring operation is carried out at a monitoring period to search for each idle radio speech channel with the number of the idle radio speech channels counted in the standby mode. The monitoring period is changed in dependence upon the number of the idle radio speech channels. Specifically, control is made so that the monitoring period becomes short when the number of the idle radio speech channels is small. This enables quick search for an idle radio speech channel even when an idle radio speech channel is not found.

4 Claims, 6 Drawing Sheets

COMMUNICATION CONTROL DEVICE CAPABLE OF QUICKLY SEARCHING FOR AN IDLE SPEECH CHANNEL IN A STANDBY MODE IN A CORDLESS TELEPHONE SYSTEM

BACKGROUND OF THE INVENTION

This invention relates to a communication control device for use in controlling communication between a plurality of cordless telephone sets and a subscriber connected to the communication control device.

A conventional communication control device of the type described is used for a radio communication network which comprises a plurality of cordless telephone sets movable within a predetermined service area. Each of the cordless telephone sets is communicable with other subscribers through the communication control device by the use of radio channels composed of a plurality of radio speech channels and a control channel. In this event, the communication control device is operable to carry out outgoing call control from each of the cordless telephone sets and incoming call control to each cordless telephone set in an operation mode and to successively monitor the radio communication channels one by one in a standby mode.

Specifically, the communication control device detects in the standby mode whether each radio speech channel is idle or busy to produce idle and busy signals representative of idle and busy states, respectively. Each of the idle and the busy signals is successively memorized in a memory at every one of the radio speech channels and is successively scanned one by one at every predetermined period to detect each state of the respective radio speech channels. In other words, each state of the radio speech channels is read out of the memory at every predetermined period. The predetermined period is defined by a switching period from each radio speech channel to the radio control channel.

Recently, the radio speech channels have increased in number due to the popularity of cordless telephone sets. The switching period becomes long with an increase of the radio speech channels and thus a long time is necessary to search for an idle speech channel. Consequently, connections for an incoming call and an outgoing call can not be made within a short time between the communication control device and each cordless telephone set in the conventional communication control device.

SUMMARY OF THE INVENTION

It is an object of this invention to provide a communication control device which is capable of quickly searching for an idle speech channel even when radio speech channels are increased in number.

It is another object of this invention to provide a communication control device of the type described, which can carry out connections for incoming and outgoing calls within a short time even when a lot of radio speech channels are put into busy states.

A communication control device to which this invention is applicable is for use in connecting a plurality of cordless telephone sets to a subscriber line through a plurality of radio speech channels and a radio control channel. According to this invention, the communication control device comprises switching means for switching the radio speech channels from one to another at a monitoring period, monitoring means for successively monitoring the plurality of the radio speech channels to detect whether or not each of the radio speech channels is put into an idle state and to successively produce an idle channel signal each time when the idle state of each radio speech channel is detected by the monitoring means, memory means coupled to the monitoring means for successively memorizing the idle channel signal at each radio speech channel, scanning means coupled to the memory means for successively scanning the memory means to count the idle channel signals memorized in the memory means and to produce a count signal representative of a count of the idle channel signals memorized in the memory means, and modifying means coupled to the scanning means and the switching means for modifying the monitoring period in accordance with the count signal to inform the switching means of the monitoring period which is modified by the modifying means.

DESCRIPTION OF THE PREFERRED EMBODIMENTS

Figure 1:
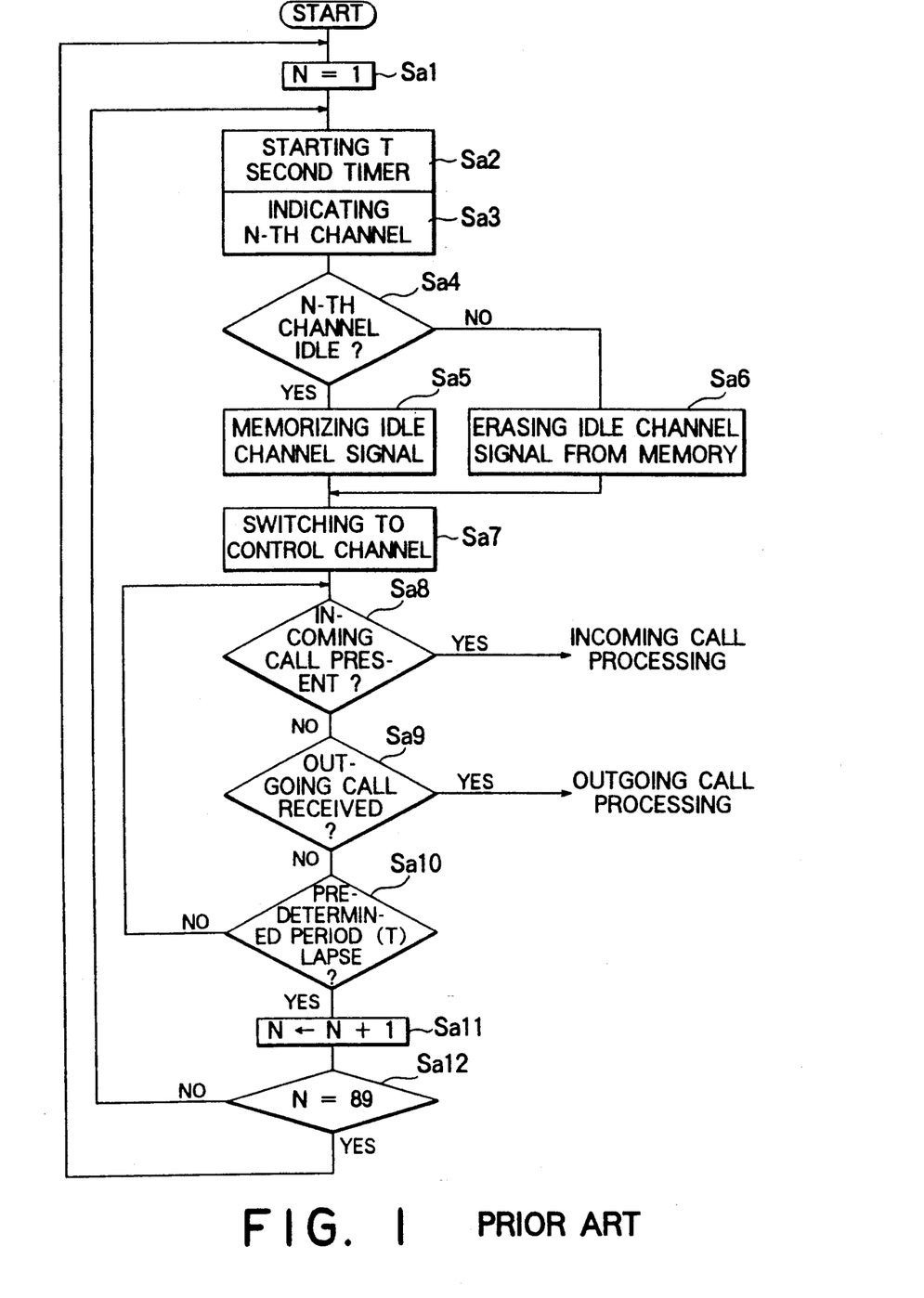
FIG. 1 shows a flow chart for use in describing operation of a conventional communication control device.

Referring to FIG. 1, description will be made about operation of a conventional communication control device which comprises a reception section, a transmission section, and a control section for controlling the reception and the transmission sections. The control section is selectively operable to put the communication control device into a standby mode and an operation or active mode, respectively. In the standby mode, the control section monitors a plurality of radio speech channels in cooperation with the reception section by successively scanning the radio communication channels one by one to search for an idle one of the radio speech channels and switches from each radio speech channel to the radio control channel at a predetermined period of, for example, T seconds. In the example being illustrated, the radio communication channels are represented by N and are assumed to be equal to 89 in total.

On the other hand, the control section processes an incoming call and an outgoing call in the operation mode in cooperation with the reception and the transmission sections. Such processing operations for the incoming call and the outgoing call may be called incoming and outgoing call control operations, respectively.

Under the circumstances, let an operation be started in the conventional communication control device to monitor and search for an idle one of the radio speech channels in the standby mode. At first, a first one of the radio communication channels is indicated by a channel indicator included in the control section. In this case, the channel indicator is set into $N=1$, as shown at a first step Sa1. Subsequently, a timer included in the control section is started at a second step Sa2 to time or measure the predetermined period T. An N-th channel is indicated by the control section to monitor the N-th channel at a third step Sa3.

The control section judges at a fourth step Sa4 whether or not the N-th radio speech channel is idle. Such judgement is made by measuring an electric field of the N-th radio speech channel. In the N-th radio speech channel is idle, the fourth step Sa4 is followed by a fifth step Sa5 at which an idle state is memorized in the form of an idle channel signal in conjunction with an idle radio speech channel in a memory included in the control section. Otherwise, the fourth step Sa4 is succeeded by a sixth step Sa6 at which an idle state is erased from the memory.

After execution of the fifth or the sixth step Sa5 or Sa6, the control section switches from the radio speech channel to the radio control channel at a seventh step Sa7. Thus, the radio control channel is indicated by the control section. In other words, the communication control device is put into a waiting state at the radio control channel. This enables quick response to the outgoing call.

Subsequently, the control section checks at an eighth step Sa8 whether or not an incoming call is present or received through the subscriber line. In addition, it is judged at a ninth step Sa9 to detect whether or not an outgoing call is received from the cordless telephone sets. At any rate, the eighth and the ninth steps Sa8 and Sa9 are succeeded by incoming call processing and outgoing call processing when the incoming call and the outgoing call are detected at the eighth and the ninth steps Sa8 and Sa9.

At a tenth step Sa10, the control section judges whether or not the predetermined period T lapses or is timed out. Unless the predetermined period T lapses, the tenth step Sa10 is returned back to the eighth step Sa8. Otherwise, the tenth step Sa10 is followed by an eleventh step Sa11 at which unity is added to N to obtain a calculation result (N+1) and which is succeeded by a twelfth step Sa12. The calculation result (N+1) is set into a new channel number N. The new channel number N is memorized in the channel indicator. At the twelfth step Sa12, judgement is made whether or not the new channel number N is equal to 89. If the new channel number N is smaller than 89, the twelfth step Sa12 is returned back to the second step Sa2. Otherwise, the twelfth step Sa12 is followed by the first step Sa1.

As mentioned before, idle channels are successively memorized in the standby mode into a memory included in the control section. With this structure, it is possible to shorten time intervals necessary for connections of the incoming call and the outgoing call.

Figure 2:
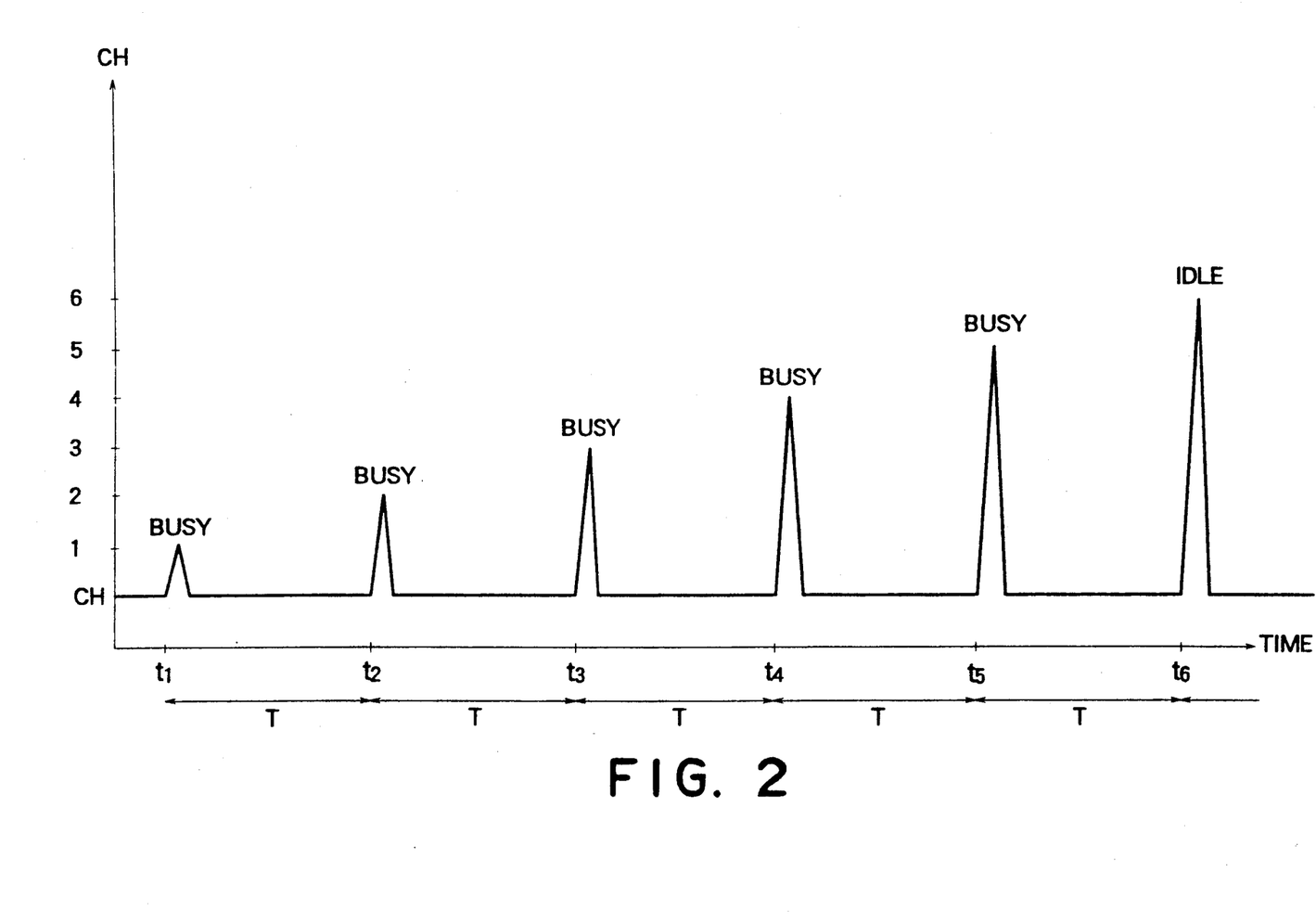
FIG. 2 shows a time chart for describing operation for searching for an idle radio channel.

Referring to FIG. 2 together with FIG. 1, let consideration be made about a search duration for searching an idle channel. Herein, it is assumed in FIG. 2 that the first through the fifth radio speech channels are busy while the sixth radio speech channel is idle. Each of the radio speech channels is assumed to be switched from one to another at the predetermined period T, as mentioned before in conjunction with FIG. 1.

Under the circumstances, the first radio speech channel is scanned at a first time instant t1 while the second through the sixth radio speech channels are scanned at second through sixth time instants t2 to t6, respectively, as illustrated in FIG. 2. In order to search for the sixth speech channel which is idle, it takes a time of, about 5T seconds in the illustrated example because the radio speech channels are scanned at every predetermined period T. Accordingly, the conventional communication control device is disadvantageous in that a comparatively long time is required until detection of the idle channel, as described in the preamble of the instant specification.

Figure 3:
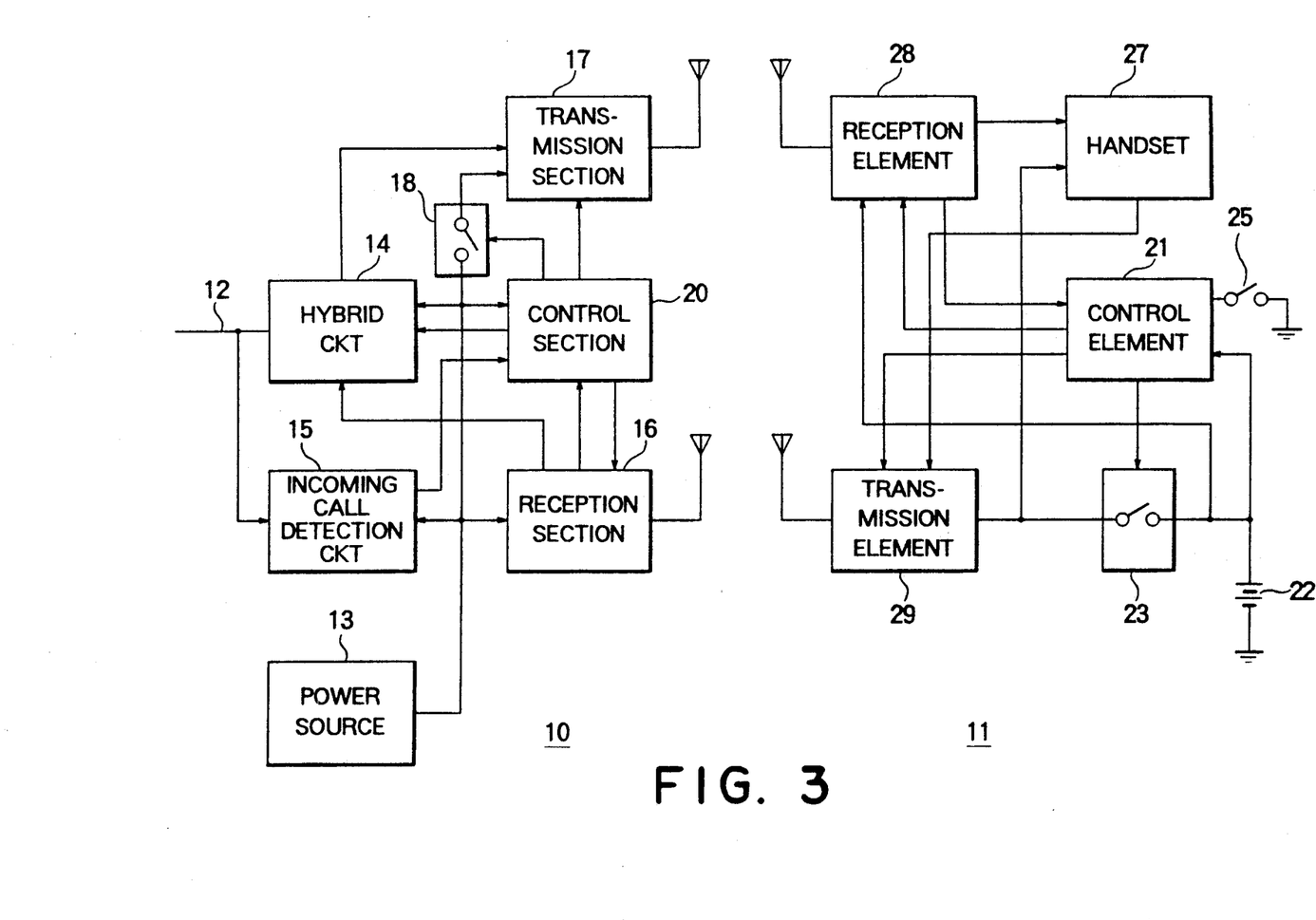
FIG. 3 shows a block diagram of a communication control device according to a preferred embodiment of this invention.

Referring to FIG. 3, a radio communication system will be described which comprises a communication control device 10 according to a preferred embodiment of this invention and a cordless telephone set 11 which may be similar in structure and operation to that of a conventional radio communication system. The illustrated communication control device 10 is connected to other subscribers (not shown) through a telephone line or a subscriber line 12 while the cordless telephone set 11 is communicable with each of the subscribers through the communication control device 10 by the use of a plurality of radio speech channels and a control channel. Although a single cordless telephone set alone is shown in FIG. 3, a plurality of cordless telephone sets may be included in the illustrated system.

The communication control device 10 comprises a power source 13 for delivering an electric voltage to various elements therein, a hybrid circuit 14 and an incoming call detection circuit 15 both of which are connected to the telephone line 12 and the power source 13, a reception section 16 directly connected to the power source 13, a transmission section 17 connected to the power source 13 through a power source switch 18, and a control section 20 enabled by the power source 13. The control section 20 is given an incoming call detection signal and an outgoing call detection signal from the incoming call detection circuit 14 and the reception section 16, respectively. Responsive to the incoming call and the outgoing call detection signals, the control circuit 10 supplies the reception section 16, the transmission section 17, the hybrid circuit 14, and the power source switch 18 with control signals to process the incoming and the outgoing calls in a manner to be described later in detail.

In FIG. 3, the illustrated cordless telephone set 11 comprises a control element 21 enabled by a battery 22, a source switch 23 connected to the battery 22 and controlled by the control element 21, a hook switch 25 connected to the control element 21, a handset 27 for transmitting and receiving a speech signal, a reception element 28 connected to the battery 22, the control element 21, and the handset 27, and a transmission element 29 connected to the handset 27, the control element 21, and the source switch 23.

As illustrated in FIG. 3, the control element 21 and the reception element 28 of the cordless telephone set 11 is directly connected to the battery 22 to be put into active states even when the source switch 23 is opened. This shows that the reception element 28 is always energized together with the control element 21 to be put into the active state and to receive a radio signal sent from the communication control device 10.

On the other hand, the source switch 23 is closed in response to a control signal sent from the control element 21 to put the transmission element 29 into the active state. In this event, the handset 27 is also put into an active state to send a radio signal through the transmission element 29 to the control communication device 10. At any rate, the illustrated cordless telephone set 11 is operable in a known manner and will not be described later in detail.

In the communication control device 10, the control section 20, the hybrid circuit 14, and the incoming call detection circuit 15, and the reception section 16 are connected direct to the power source 13 to be always put into active states. On the other hand, the transmission section 17 is energized on closure of the power source switch 18 because the power source 13 is connected to the transmission section 17 through the power source switch 18 when the power source switch 18 is closed by the control section 20.

The control section 16 supervises the reception section 16 and the transmission section 17 to control a reception operation, namely, outgoing call processing and a transmission operation, namely, incoming call processing of the reception and the transmission sections 16 and 17, respectively. In addition, the control section 20 controls the hybrid circuit 14 and the power source switch 18, as illustrated in FIG. 3.

When an incoming call is given to the communication control device 10 through the subscriber line 12, the incoming call detection circuit 15 informs the control section 20 of reception of the incoming call. In this event, the control section 20 puts the power source switch 18 into a closed state to energize the transmission section 17. Under the circumstances, the incoming call is sent through the hybrid circuit 14 to the transmission section 17. The transmission section 17 assigns the incoming call to an idle radio speech channel under control of the control section 20. As a result, the incoming call is transmitted from the transmission section 17 to the cordless telephone set 11 in the form of the radio signal.

In the meantime, let an outgoing call be received through a selected one of the radio speech channels from the cordless telephone set 11. The outgoing call is sent through the reception section 16 to the hybrid circuit 14 under control of the control section 20 and supplied to the subscriber liner 12.

The above-mentioned operation is similar to that of the conventional communication control device and will therefore not be described any longer.

Herein, it is to be noted that the control section 20 is operable to scan the radio speech channels to successively search for an idle radio speech channel in cooperation with the reception section 16. The illustrated control section 20 serves to quickly search for such an idle radio speech channel in a manner which is to be described later in detail and which is different from the conventional manner.

Figure 4:
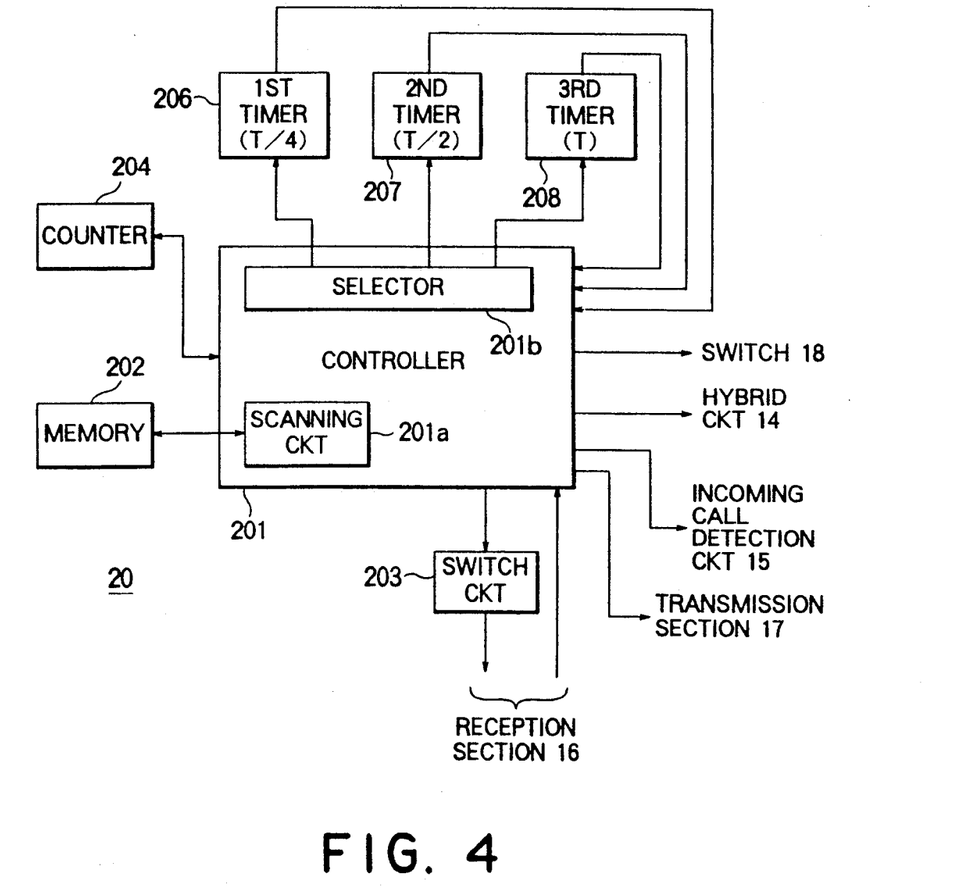
FIG. 4 shows a block diagram of a part of the communication control device illustrated in FIG. 3.
Figure 5:
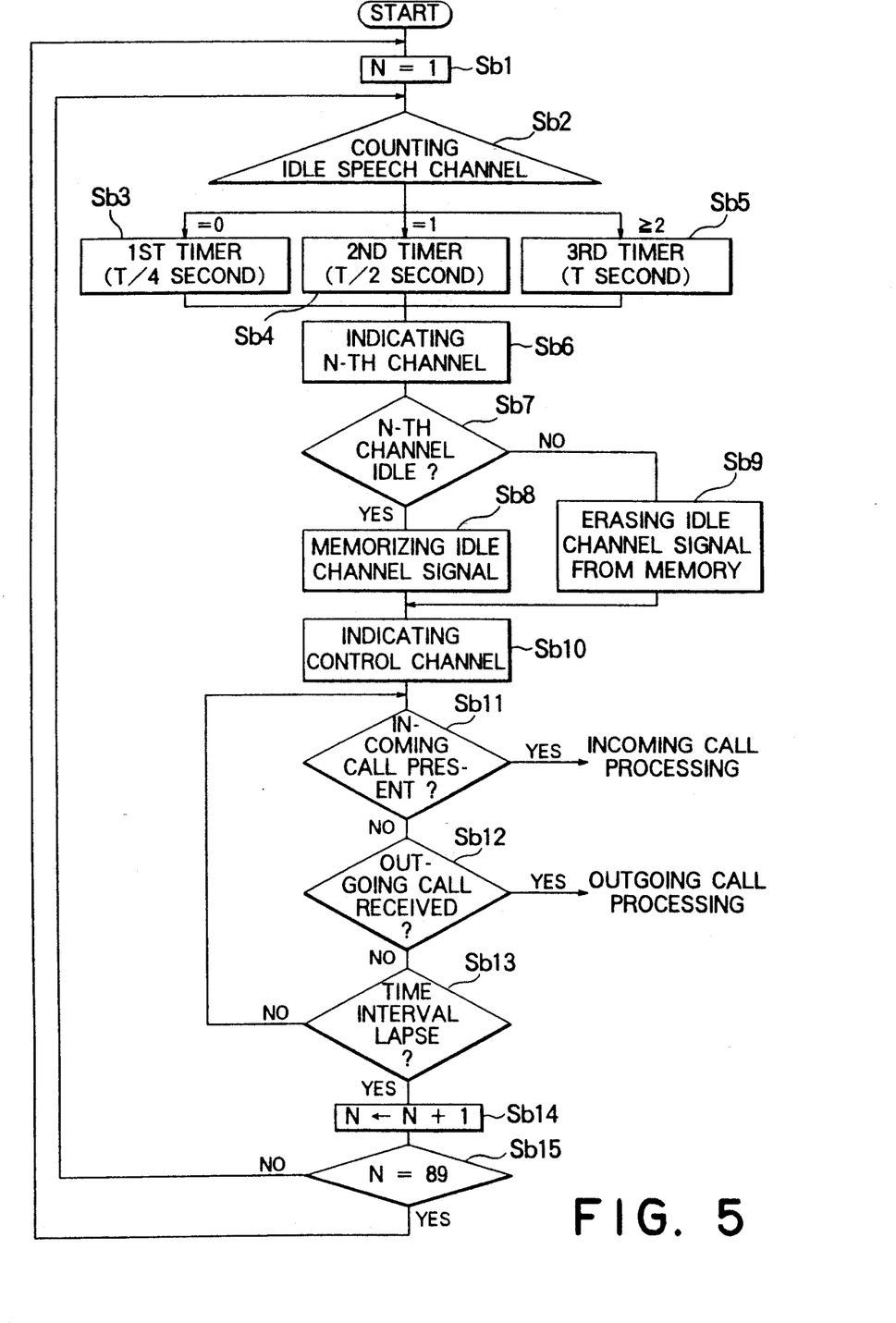
FIG. 5 shows a flow chart for use in describing operation of the communication control device illustrated in FIG. 3.

Referring to FIGS. 4 and 5 in addition to FIG. 3, the control section 20 illustrated in FIG. 3 comprises a controller 201 which executes control operation in a manner to be described later and a memory 202 for memorizing an idle channel signal at every radio speech channel. Specifically, the memory 202 has a plurality of addresses which correspond to the respective radio speech channels of, for example, first through eighty-ninth radio speech channels. The idle channel signal is representative of an idle state of each radio speech channel.

The illustrated controller 201 is selectively operable in an active (operation) mode and a standby mode. In the active mode, the controller 201 is operated to process incoming and outgoing calls in a known manner. Therefore, no description will be made about the active mode.

On the other hand, the standby mode is for quickly searching for an idle radio speech channel in a novel manner. In this connection, the following description will be mainly made about the standby mode alone.

In FIG. 4, the controller 201 monitors the reception section 16 (FIG. 3) to detect whether each radio speech channel is idle or busy and to switch from each radio speech channel to the radio control channel at a monitoring period. For the time being, it suffices to say that the monitoring period is changed from a predetermined period T (seconds) in a manner to be described later. Detection of such an idle radio speech channel is carried out by measuring an electric field of each channel. To this end, the controller 201 is directly connected to the reception section 16 on one hand and is connected through a switch circuit 203 to switch the channels from one to another on the other hand.

Any other control operations are carried out by the controller 201 in connection with the transmission section 17, the power source switch 18, the incoming call detection circuit 15, and the hybrid circuit 14 in a known manner.

In the illustrated example, the control section 20 comprises a counter 204 which may be called a channel indicator for successively indicating each of the radio speech channels and first through third timers 206 to 208 for measuring first through third time intervals which may be equal to T/4, T/2, and T seconds, respectively, where T is representative of the predetermined period. The illustrated timers 206 to 208 are connected to the controller 201.

In FIGS. 4 and 5, the counter 204 is loaded at a first step Sb1 of the standby mode with a first speech channel number. Specifically, the counter 204 is set into unity, namely, 1 at the first step Sb1 under control of the controller 201, as shown by N=1 in FIG. 5.

At a second step Sb2, the controller 201 detects a count of idle speech channels by counting the idle channel signals memorized in the memory 202. This shows that the controller 201 is operable to scan the memory 202 at the monitoring period and to count the idle channel signals. In this connection, the controller 202 may be considered as having a scanning circuit depicted at 201a in FIG. 4. If the count is equal to zero, the first timer 206 (FIG. 4) is started, as illustrated at a third step Sb3. The first counter 206 is for measuring the first time interval equal to T/4 (sec), as mentioned before and is therefore reset at every time interval of T/4. When a single idle channel is detected at the second step Sb2, the second timer 207 is started to measure the second time interval T/2 (sec) and to be reset at every time interval of T/2, as illustrated at a fourth step Sb4. Furthermore, the third timer 208 is started to measure the third time interval equal to the predetermined period T (sec) and to be reset at every predetermined period T (sec), as shown at a fifth step Sb5, if the count is equal to or greater than two.

Thus, the controller 201 is operable to select the first and the third timers 206 to 208 and to modify the monitoring period in cooperation with the first through the third timers 206 to 208. In this connection, the controller 201 serves as a selector (depicted at 201b) and the first through the third timers 206 to 208 collectively serves as a period modifying circuit. In addition, a combination of the selector 202b and the first through the third timers 206 to 208 may be referred to as a modifying circuit for modifying the monitoring period.

At a sixth step Sb6, the controller 201 designates the first radio speech channel as the N-th radio speech channel. In this case, the first radio speech channel is sent through the switch circuit 203 to the reception section 16. As a result, the reception section 16 monitors the first radio speech channel to detect whether the first radio speech channel is idle or busy, as shown at a seventh step Sb7. Accordingly, the reception section 16 may be called a monitoring circuit for monitoring the radio speech channels.

If the first radio speech channel is idle, the seventh step Sb7 is followed by an eighth step Sb8 at which the idle channel signal is memorized in a memory address assigned to the first radio speech channel. Otherwise, the eighth step Sb8 is succeeded by a ninth step Sb9 at which the idle channel signal is erased in the memory address assigned to the first radio speech channel.

Subsequently, the first radio speech channel is switched to the control channel through the switch circuit 203 (FIG. 4) at a tenth step Sb10. Herein, a time interval from either one of the third through the fifth steps Sb3 to Sb5 to the tenth step Sb10 defines the monitoring period for monitoring an idle speech channel.

The tenth step Sb10 is succeeded by an eleventh step Sb11 of judging whether or not an incoming call is present. If the incoming call is given through the subscriber line 12, incoming call processing is carried out in the known manner. Otherwise, the eleventh step Sb11 is followed by a twelfth step Sb12 to judge whether or not an outgoing call is received from the cordless telephone set 11. If the outgoing call is present, outgoing call processing is carried out in the known manner. Otherwise, a thirteenth step Sb13 follows the twelfth step Sb12 to detect whether or not a selected one of the first through the third time intervals T/4, T/2, and T lapses or is timed out. As long as the selected time interval does not lapse, processing is returned back to the eleventh step Sb11.

In any event, when the selected time interval lapses, the counter 204 is counted up by one into (N+1) at a fourteenth step Sb14 to indicate an (N+1)-th radio speech channel as a next radio speech channel. At a fifteenth step Sb15, the controller 201 judges whether or not the next radio speech channel is equal to 89. If the next radio speech channel becomes equal to 89, processing is returned back to the first step Sb1. Otherwise, the second step Sb2 is executed after the fifteenth step Sb15.

The above-mentioned operation is repeated at every radio speech channel. During the operation, the first through the third timers 206 to 208 are selected in dependence upon the count or number of the idle speech channels detected at the second step Sb2. In addition, the monitoring period between either one of the steps Sb3 to Sb5 and the tenth step Sb10 becomes long with an increase of the number of the idle speech channels. From this fact, it is readily understood that operation for searching for an idle speech channel becomes fast when no idle speech channel is present.

Figure 6:
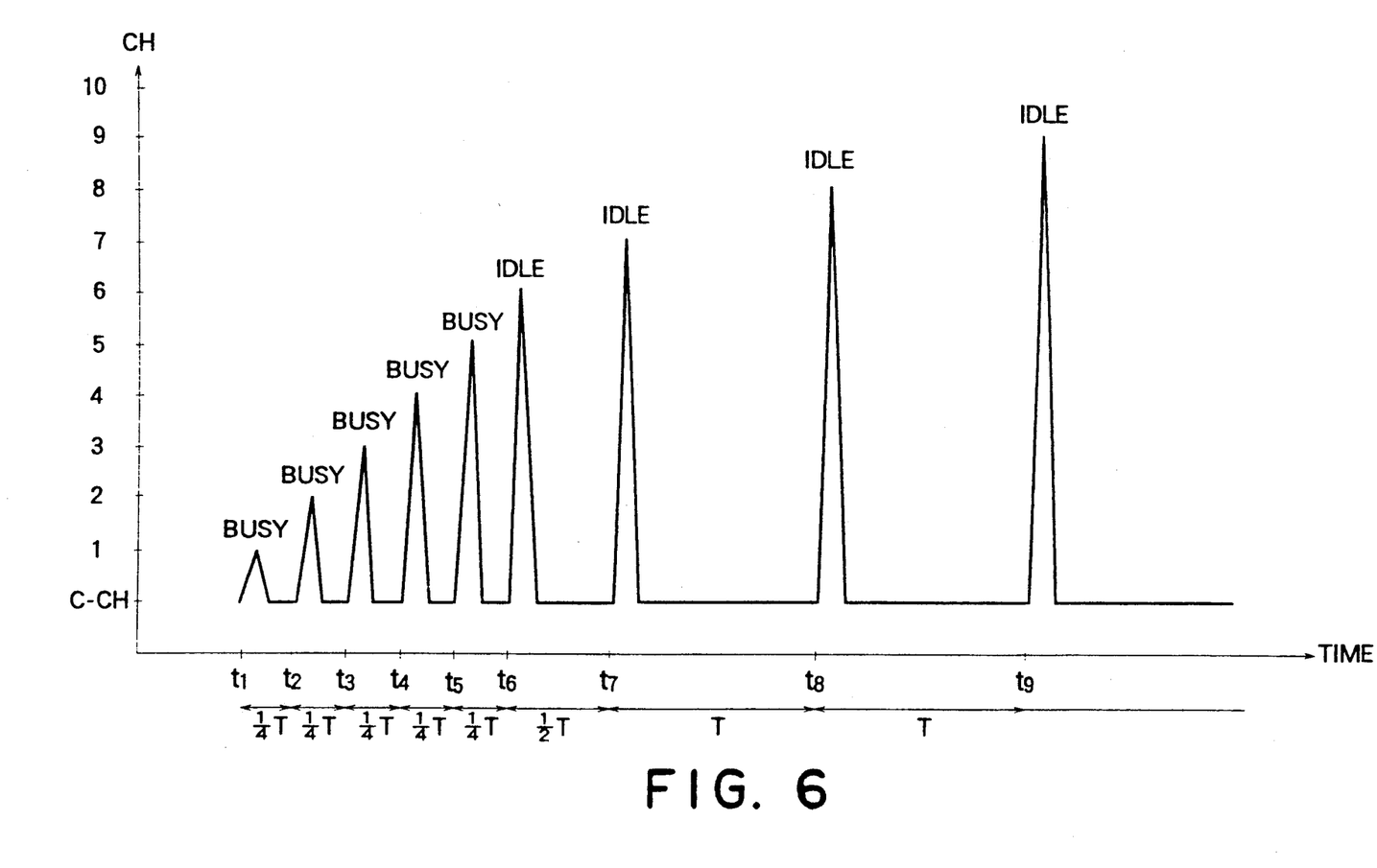
FIG. 6 shows a time chart for describing operation for searching for an idle radio channel.

Referring to FIG. 6, the searching operation is exemplified in the communication control device illustrated with reference to FIGS. 3 through 5. In FIG. 6, it is assumed that the first through the fifth radio speech channels are busy while the sixth through the tenth radio speech channels are idle. In this event, the monitoring period of the first through the fifth radio speech channels is equal to T/4 (sec). This means that the first through the fifth radio speech channels are scanned at every monitoring period of T/4 (sec) at first through fifth time instants t1 to t5. When the sixth radio speech channel is scanned at a sixth time instant t6 and a single idle radio speech channel is found, the monitoring period is changed from T/4 to T/2 (sec), as illustrated in FIG. 6. Two idle radio speech channels are found at a seventh time instant t7, the monitoring period then becomes equal to T. Thereafter, the monitoring period is kept unchanged in the illustrated example even when the idle radio speech channels are increased in number.

Thus, merely about a time interval of 5T/4 (sec) is necessary until it is confirmed that the sixth radio speech channel is idle, although a time interval of 5T seconds is necessary to find the sixth radio speech channel idle in the conventional communication control device illustrated in FIG. 2. Therefore, it is possible to quickly detect or find an idle radio speech channel as compared with the conventional communication control device.

While this invention has thus far been described in conjunction with a preferred embodiment thereof, it will readily be possible for those skilled in the art to put this invention into practice in various other manners. For example, the monitoring period may be changed in various manners by the use of a lot of timers which measure different time intervals. The present invention may be applicable to a system which comprises a plurality of mobile radio stations instead of the cordless telephone sets. In addition, the monitoring period may be changed from one to another regardless of a time instant for switching from the radio speech channel to the radio control channel.

What is claimed is:

1. A communication control device for use in connecting a plurality of cordless telephone sets to a subscriber line through a plurality of radio speech channels and a radio control channel, said communication control device comprising:

switching means for switching said radio speech channels form one to another at a monitoring period;

monitoring means for successively monitoring said plurality of the radio speech channels to detect whether or not each of the radio speech channels is put into an idle state and to successively produce an idle channel signal each time when the idle state of each radio speech channel is detected by said monitoring means;

memory means coupled to said monitoring means for successively memorizing said idle channel signal at each radio speech channel;

scanning means coupled to said memory means for successively scanning said memory means to count said idle channel signals memorized in said memory means and to produce a count signal representative of a count of said idle channel signals memorized in said memory means; and modifying means coupled to said scanning means and said switching means for modifying said monitoring period in accordance with said count signal and informing said switching means of said monitoring period which is modified by said modifying means.

2. A communication control device as claimed in claim 1, wherein said modifying means comprises:

period change means coupled to said scanning means for changing said monitoring period so that said monitoring period becomes long as the count represented by said count signal becomes large; and informing means for informing said switching means of said switching period.

3. A communication control device as claimed in claim 2, wherein said period change means comprises:

a plurality of timers for defining a plurality of time intervals which are different from one another; and selecting means coupled to said scanning means and said timers for selecting a selected one of said timers that is determined by said count signal.

4. A communication control device as claimed in claim 1, wherein said monitoring period of said switching means is defined in accordance with a switching period from each of said radio speech channels to said radio control channel.

* * * * *